(12) United States Patent
Siciliano et al.

(10) Patent No.: US 7,892,693 B2
(45) Date of Patent: Feb. 22, 2011

(54) FUEL CELL PLANARLY INTEGRATED ON A MONOCRYSTALLINE SILICON CHIP AND PROCESS OF FABRICATION

(75) Inventors: Simone Angelo Siciliano, Gela (IT); Luigi La Magna, Scordia (IT); Salvatore Leonardi, Aci S. Antonio (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 1103 days.

(21) Appl. No.: 11/611,521

(22) Filed: Dec. 15, 2006

(65) Prior Publication Data

US 2007/0148527 A1    Jun. 28, 2007

(30) Foreign Application Priority Data

Dec. 16, 2005    (EP)    ................... 05425892

(51) Int. Cl.
*H01M 8/10*    (2006.01)
*H01M 4/86*    (2006.01)
*H01M 4/88*    (2006.01)

(52) U.S. Cl. ................ 429/479; 429/524; 502/101

(58) Field of Classification Search ............... 429/400, 429/479–497, 507–508, 523–526, 532–535; 502/101
See application file for complete search history.

(56) References Cited

U.S. PATENT DOCUMENTS

| | | | |
|---|---|---|---|
| 5,316,869 A | 5/1994 | Perry, Jr. et al. | 429/17 |
| 6,506,513 B1 | 1/2003 | Yonetsu et al. | 429/34 |
| 6,541,149 B1 | 4/2003 | Maynard et al. | 429/40 |
| 6,558,770 B1 | 5/2003 | Lehmann et al. | 428/138 |
| 6,589,682 B1 | 7/2003 | Fleckner et al. | 429/34 |
| 6,610,433 B1 | 8/2003 | Herdeg et al. | 429/17 |
| 6,627,342 B1 | 9/2003 | Nakamura et al. | 429/26 |
| 6,641,948 B1 | 11/2003 | Ohlsen et al. | 429/44 |
| 6,740,444 B2 | 5/2004 | Leban | 429/41 |
| 6,811,916 B2 | 9/2004 | Mallari et al. | 429/39 |
| 2002/0020053 A1 | 2/2002 | Fonash et al. | 29/623.1 |
| 2002/0041991 A1 | 4/2002 | Chan | 429/44 |
| 2003/0003347 A1 | 1/2003 | D'Arrigo et al. | 429/44 |
| 2003/0022052 A1 | 1/2003 | Kearl | 429/34 |
| 2003/0096146 A1 | 5/2003 | Foster | 429/30 |
| 2003/0134172 A1 | 7/2003 | Grande et al. | 429/34 |
| 2003/0135971 A1* | 7/2003 | Liberman et al. | 29/419.1 |
| 2004/0058153 A1 | 3/2004 | Ren et al. | 428/408 |

(Continued)

FOREIGN PATENT DOCUMENTS

DE    19757320    7/1999

(Continued)

*Primary Examiner*—Basia Ridley
*Assistant Examiner*—Jacob Buchanan
(74) *Attorney, Agent, or Firm*—Lisa K. Jorgenson; Allen, Dyer, Doppelt, Milbrath & Gilchrist, P.A.

(57) ABSTRACT

A fuel cell is entirely fabricated on a single monocrystalline silicon substrate, and substantially overcomes leak proofing and wafer bonding difficulties and criticalities while ensuring an intrinsic sturdiness of the planarly integrated functional structure of the fuel cell. The integrated fuel cell is formed in an oxidized porous silicon region on a monocrystalline silicon substrate that is pervious to fluid flow and is electrically nonconductive with the monocrystalline silicon substrate.

21 Claims, 7 Drawing Sheets

U.S. PATENT DOCUMENTS

| | | | |
|---|---|---|---|
| 2005/0003263 A1* | 1/2005 | Mallari et al. | 429/44 |
| 2005/0053826 A1* | 3/2005 | Wang et al. | 429/44 |
| 2005/0130021 A1* | 6/2005 | Marsh | 429/38 |
| 2006/0188774 A1* | 8/2006 | Niu et al. | 429/44 |
| 2007/0048589 A1* | 3/2007 | Koripella et al. | 429/38 |

FOREIGN PATENT DOCUMENTS

| | | |
|---|---|---|
| DE | 19914681 | 10/2000 |
| EP | 1258937 | 11/2002 |
| JP | 7201348 | 8/1995 |
| WO | 00/45457 | 8/2000 |
| WO | 00/69007 | 11/2000 |
| WO | 02/080298 | 10/2002 |
| WO | 03/002247 | 1/2003 |

* cited by examiner

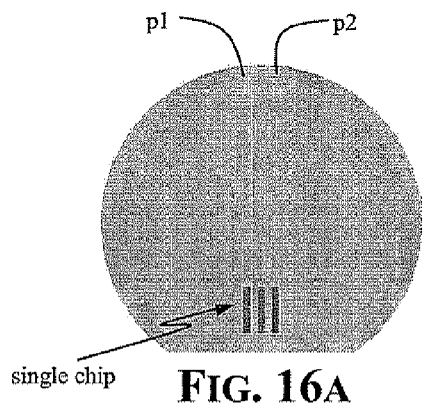
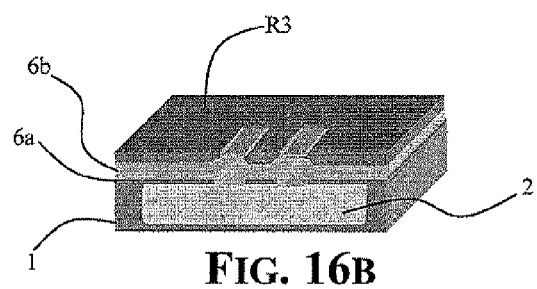
FIG. 16A
FIG. 16B
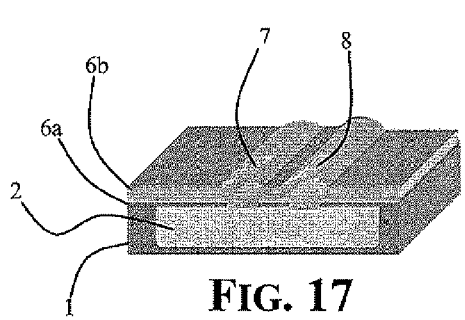
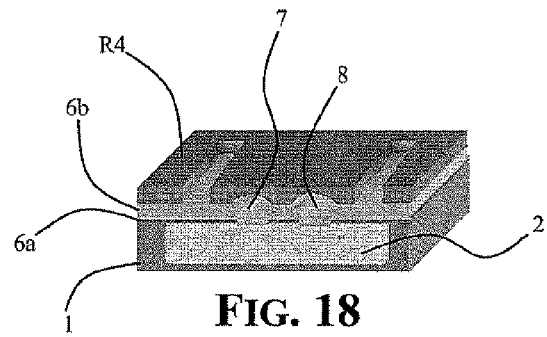
FIG. 17
FIG. 18
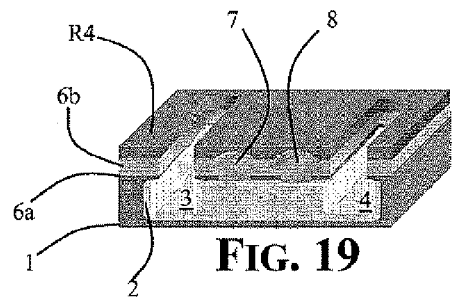
FIG. 19
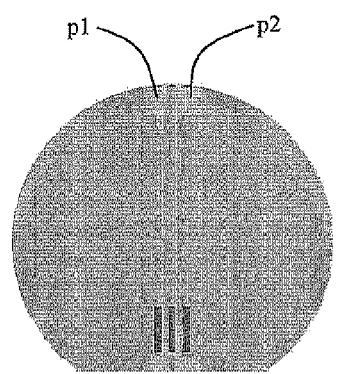
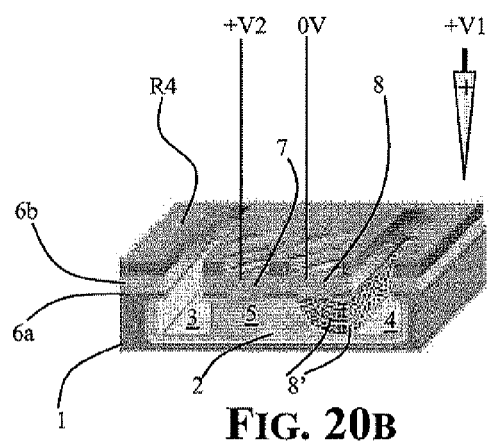
FIG. 20A
FIG. 20B

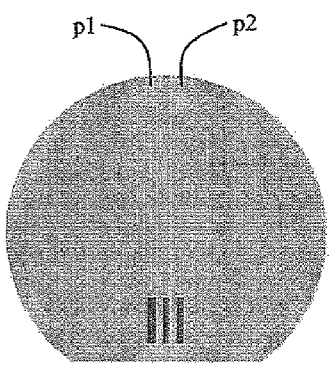
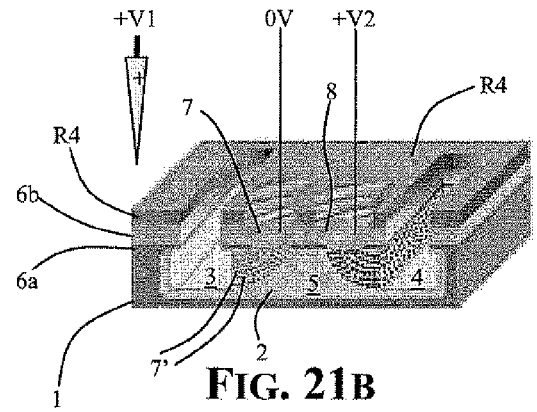
FIG. 21A    FIG. 21B
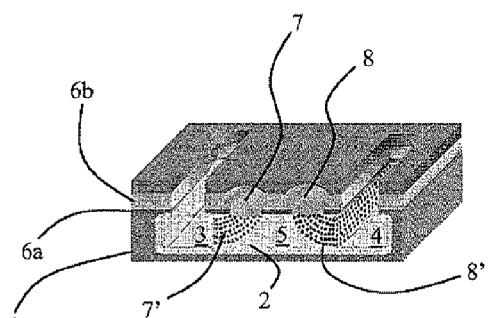
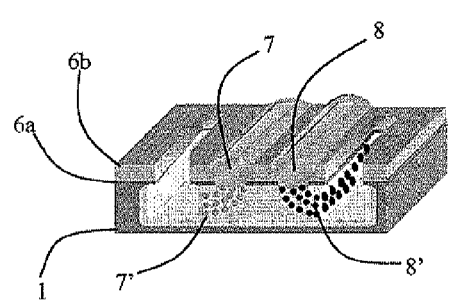
FIG. 22    FIG. 23
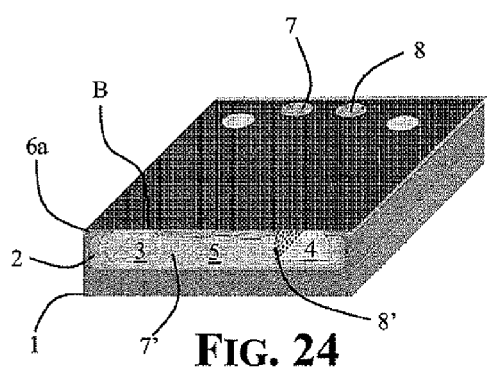
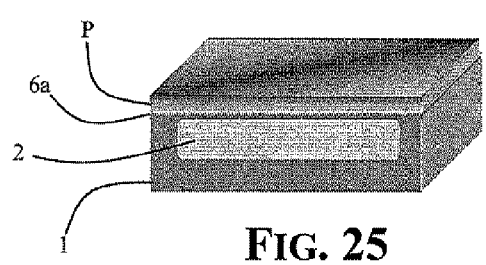
FIG. 24    FIG. 25
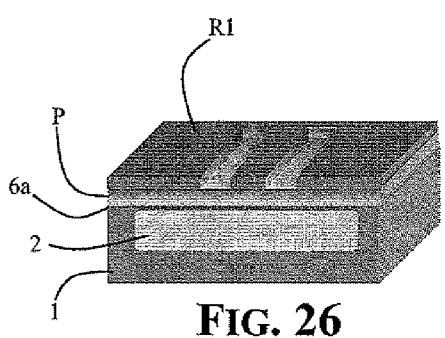
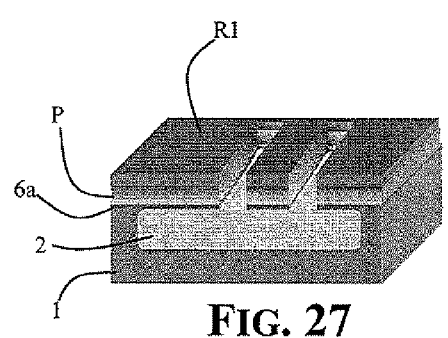
FIG. 26    FIG. 27

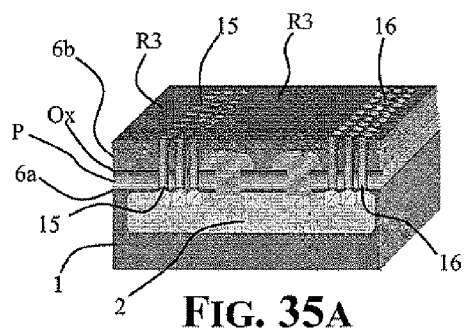
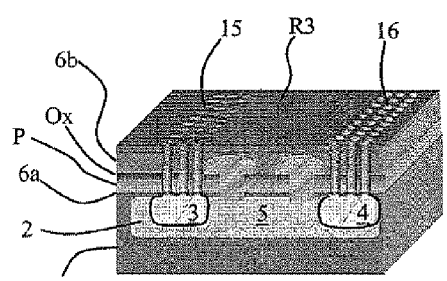
FIG. 35A   FIG. 35B
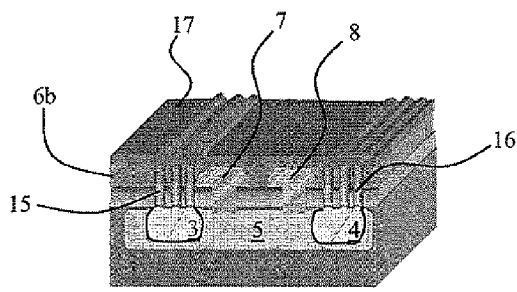
FIG. 36
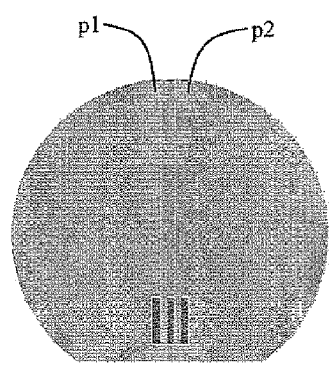
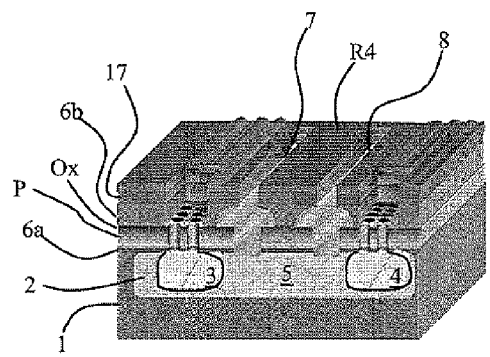
FIG. 37A   FIG. 37B
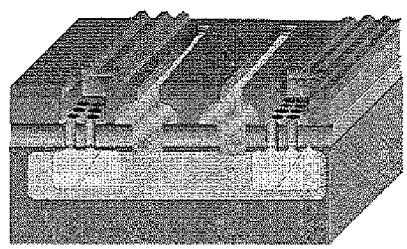
FIG. 38

FUEL CELL PLANARLY INTEGRATED ON A MONOCRYSTALLINE SILICON CHIP AND PROCESS OF FABRICATION

FIELD OF THE INVENTION

The present invention relates in general to silicon devices, and more particularly, to silicon micro fuel cells for powering integrated circuits.

BACKGROUND OF THE INVENTION

Efforts to render portable apparatuses and electronic devices, already sufficiently scaled down through current fabrication techniques, encounter difficulties in finding portable sources of electrical energy capable of ensuring a prolonged autonomy. The portable sources are batteries with a high energy/volume or weight ratio.

In fact, not withstanding miniaturization and constant reduction of power absorption by current integrated electronic systems, the constant increase of offered functionalities of single portable instruments implies heavy burdens on rechargeable batteries commonly employed to power these portable instruments.

In terms of the limits of the energy/volume and/or weight ratio, even for the most advanced rechargeable batteries being used, attention has shifted onto primary energy converters. In particular, attention is shifted onto the fuel cells capable of converting the chemical energy of an oxidable fuel (either gaseous as hydrogen or liquid as a methanol and other oxidable fuel solutions) into electrical energy in an electrochemical cell.

These cells, commonly referred to as fuel cells, are constituted by catalytic electrodes permeable to the fluid reagent. They are separated by a solid electrolyte, commonly of a proton ($H^+$) exchanging resin which, besides representing the medium for the passage of an ionic current (migration of ions), separates the fuel fed to the negative micro porous catalytic electrode (anode) from the oxygen (air or other oxygen containing mixtures) fed to the positive micro porous catalytic counterelectrode (cathode) of the cell.

Fuel cells could offer an energy/weight ratio greater than that of even the most advanced rechargeable batteries. Their operability as electrical power sources may be considered unlimited given an unlimited availability of fuel that may be stored in relatively large quantities in a small container (even pressurized in case of a gaseous fuel).

Efforts are being made to develop effective micro cell architectures that can be realized on monocrystalline silicon, through modern MEMS techniques of micromachining silicon including the ability of forming cavities by electrochemical preferential erosion of heavily doped domains of the crystal. This is followed by oxidation of the porous silicon residue, and optionally by a chemical leach of the oxidized residue. In general, silicon micromachining techniques have been developed for fabricating transducers, actuators, sensors and other passive components directly on the same chip onto which is integrated the circuit or electronic subsystem employing the transducers, actuator, sensor or the peculiar passive structure formed by micromachining a portion of the monolithic crystalline silicon chip. These techniques are exploited for forming micro machined silicon parts of micro fuel cells.

The following documents: U.S. Pat. Nos. 6,541,149; 6,811,916; 6,558,770; 6,641,948; 5,316,869; 6,627,342; 6,740,444; 6,506,513; 6,589,682; 6,610,433, and published U.S. Patent Applications No. 2003/0022052A1; 2003/0096146A1; 2002/0020053A1; 2003/0134172A1; 2002/0041991A1; 2003/0003347A1; 2004/0058153A1; and the foreign documents WO0069007; DE19914681A; WO 0045457; DE19757320A; JP07201348 and EP-A-1258937 provide a review of disclosed architectures of silicon micro fuel cells.

All these prior art architectures imply the use of distinct dices of micro machined monocrystalline silicon to be eventually joined by wafer bonding techniques to sandwich a film of ion exchanging resin constituting the solid electrolyte of the cell or cells therebetween.

These known architectures are relatively delicate to assemble while providing for a leak proof sealing of the distinct microfluid circuits for the circulation of the fuel and of the oxidant in the respective anodic and cathodic compartments of the cell or cells composing the battery. These difficulties and criticalities increase costs.

SUMMARY OF THE INVENTION

In view of the foregoing background, an object of the present invention is to provide a cell architecture that would permit fabrication of the fuel cell entirely on a single monocrystalline silicon substrate, and substantially overcomes leak proofing and wafer bonding difficulties and criticalities while ensuring an intrinsic sturdiness of the planarly integrated functional structure of the fuel cell.

The cell may be entirely fabricated in a predefined region of a monolithic crystalline silicon substrate preliminarily heavily doped with one or more dopants. Thereafter, it is subjected to electro-erosion in a hydrofluoric acid solution to leave in the region a highly porous residual silicon structure that is thereafter oxidized to render it practically nonconductive. Open and interconnected pores permit fluid to flow therethrough, along any spatial direction. The fuel cell structure is entirely formed in the oxidized porous silicon region to be eventually closed at the surface by a dielectric cap through which inlet and outlet ports for the feed fuel and oxidant circulation in the respective channel are formed.

The planarly integrated fuel cell structure is formed in a region preliminarily rendered pervious to fluid flow, and is electrically nonconductive with respect to the monocrystalline silicon substrate. The fuel cell may comprise at least a pair of parallel channels, an anode feed channel and a cathode feed channel, respectively, extending in the oxidized porous oxidized silicon region and defining a central oxidized porous silicon ridge therebetween. A dielectric cap may be over the channeled oxidized porous silicon region, having at least an inlet and an outlet hole formed therethrough in correspondence of one end and the opposite end, respectively, of each one of the parallel channels underneath. This is for separately circulating a fluid fuel in the anode channel and air or other oxygen containing mixture in the cathode channel.

A pair of parallel spaced solid metal cell electrodes may extend over the top surface of the central oxidized porous silicon ridge defined between the parallel channels, for the whole length of the channels. Uninterrupted electrically conductive threads of a catalytic metal are cathodically deposited. They stem from a bottom surface of each of the solid metal cell electrodes and extend to the side face of the central ridge of oxidized porous silicon constituting a side wall of the channel extending alongside of the electrode.

Ion permeable resin fills the pores of the nonconductive porous silicon in the innermost central portion of the ridge to impede fluid flow from one channel to the other, and only partly fills the pores in proximity of the definition sides of the central ridge constituting side walls of one and of the other of the parallel channels. This forms uninterrupted ion permeable resin domains extending from catalytic metal threads stemming from one solid metal cell electrode to catalytic metal threads stemming from the other solid metal cell electrode. The two parallel solid metal cell electrodes may be electrically connected to a load circuit of the cell.

BRIEF DESCRIPTION OF THE DRAW

FIGS. 5 to 24 illustrate the sequence of fabrication steps of the structure according to a first embodiment of the process of the invention.

FIGS. 25 to 38 illustrate the sequence of basic fabrication steps according to an alternative embodiment of the process of fabrication of the invention.

DETAILED DESCRIPTION OF THE PREFERRED EMBODIMENTS

Figure 1:
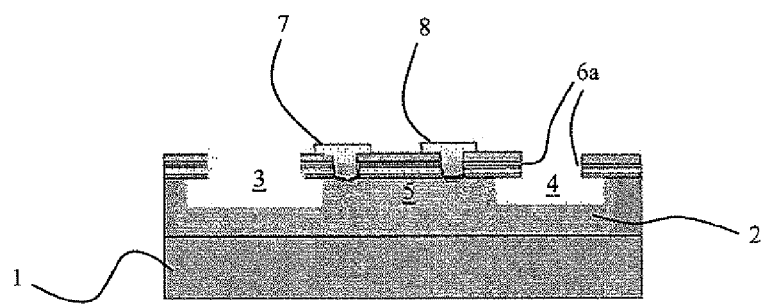
FIGS. 1 and 2 are cross-sectional views of a planarly integrated fuel cell structure of the invention.
Figure 2:
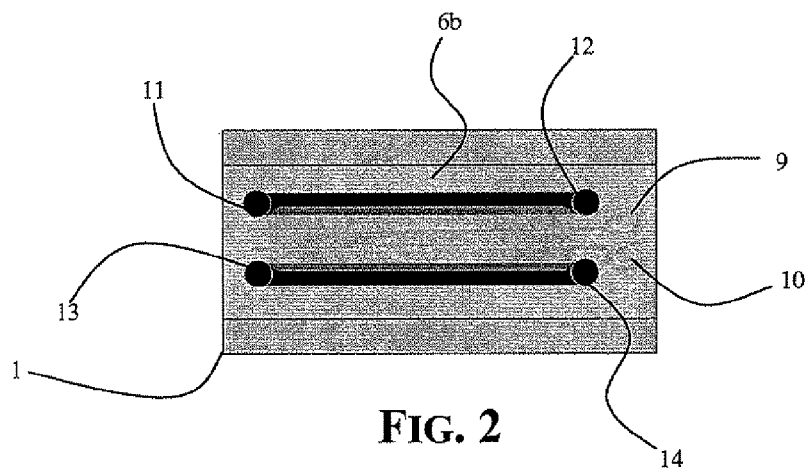

The simplified cross-sectional and layout views of FIGS. 1 and 2 provide a general illustration of the planarly integrated fuel cell structure of the invention. As may be immediately recognized, the whole functional structure of the fuel cell is entirely formed on a single monocrystalline silicon substrate 1, and specifically in a region of nonconductive oxidized porous mass of silicon 2, pervious to fluid flow, in which a first channel 3 and a second channel 4 are formed in parallel for separately circulating therethrough the feed fuel and the oxygen containing mixture.

The formation of the two parallel channels 3 and 4 defines a central ridge portion 5 of the nonconductive oxidized porous silicon that constitutes the skeleton of the functional fuel cell structure, as will now be described in detail.

The separation of the distinct fuel and oxidant fluids fed or circulated into the respective channels 3 and 4 is ensured by a final impregnation of the oxidized porous silicon with a precursor liquid solution of the solid permeable resin (for example, with liquid Nafion®) that, upon a final solvent evaporation/curing treatment of the resin, completely fills the pores of the oxidized porous silicon skeleton in the innermost or central part of the cross section of the longitudinally extending ridge 5. This practically impedes any fluid flow transversally from one channel on one side of the ridge 5 to the other channel on the other side of the ridge 5, as will be described in more detail when illustrating the relevant process steps.

Through a multilayered dielectric stack 6a, first and second solid metal cell electrodes, an anode 7 and a cathode 8 are formed by filling with a metal, for example with generally deposited gold over a cathodically polarized metallic seed layer, longitudinal parallel openings through the thickness of the dielectric stack 6a. The solid metal electrodes 7 and 8 longitudinally extend for the entire length of the underlying oxidized porous silicon 2 reaching down to the top surface of the porous central ridge portion 5 of oxidized silicon 2.

Through a subsequent galvanic deposition, conducted by cathodically polarizing the two parallel electrodes 7 and 8 with respect to an electrolytic solution of a catalytic metal in which the wafer is immersed, and to one or a plurality of anodically polarized counterelectrodes immersed in the solution, uninterrupted electrically conductive threads of deposited catalytic metal, generally selected among platinum, iridium, ruthenium, palladium, rhodium and alloys thereof, are grown through the open pores of the oxidized silicon structure 2 of the central ridge 5 until reaching the openings of the pores on the respective side wall of the ridge 5. This defines the nearby parallel channel. This constitution of catalytically active, locally dispersed electrode threads exposed to the contact with the relative reactant fluid and in contact with the above mentioned ion permeable resin domains create at and in proximity of the definition side face of the oxidized porous silicon ridge 5, a multitude of three-phase sites supporting the relative half-cell reaction.

Of course, in case different catalytic metals are chosen for constituting the active deposited anode structure and the active dispersed cathode structure, two distinct electro-deposition steps are to be performed using respective solutions of the selected metal and counter biasing the deselected electrode to grow the catalytic metal threads toward the correct side face of the central ridge 5.

A final impregnation of the oxidized porous silicon skeleton with ion selective permeable resin, carried out after having completed the formation of the dispersed active electrode structures, seals the voids in the immersed central part of the porous ridge 5. This prevents any intermixing of the two feed fluids and creates uninterrupted domains of permionic resin extending from active sites of one dispersed electrode structure to active sites of the other dispersed electrode of the cell.

The conditions of implant of the dopant in the silicon crystal of the region 2 of conducting the electrochemical erosion of the doped silicon region and/or in conducting the etching of the oxidized porous silicon skeleton structure for forming the two parallel channels 3 and 4, are such to favor the formation of progressively larger pores in the oxidized porous silicon skeleton of the ridge portion 5. This approaches the side faces of definition of the two parallel channels than the average pore size in the innermost central part of the ridge 5.

Such a transversal non-uniformity of the average pore size of the oxidized silicon skeleton favors a secure sealing of the finer pores in the central innermost part of the ridge 5. This is while the filling of the voids by the ion permeable resin becomes progressively incomplete and eventually fill only a minor portion of the layer and layer pores upon approaching the side definition face of the ridge portion 5.

This enhances availability of innumerable three-phase sites reachable by the reactant fluid encroaching into the voids of the central ridge 5, through the pores that open on the definition side wall of the fluid feed channel. The innermost part of the ridge 5 of finer porosity is located underneath the separation between the two parallel solid metal electrodes 7 and 8 at the top of the ridge 5.

A layout view of the planarly integrated fuel cell of FIG. 2 shows the locations of electrical connection pads 9 and 10 of the cell electrodes to the external load circuit of the fuel cell and the inlet and outlet holes 11, 12, 13, 14 at the opposite ends of the two parallel channels 3 and 4 through a dielectric cap 6b. It is intuitive the uncritical manner in which the inlet and outlet openings 11, 12, 13, 14 of the two parallel feed channels 3, 4, of the two distinct microfluidic feed circuits can be connected. For example, they can be connected through the encapsulating resin package of the finished integrated device to an external microfluidic control unit.

As will be described in more detail below, the functional cell structure can be fabricated through common silicon processing techniques without introducing any critical step that could endanger the integrity of the cell structure being fabricated. Once finished and packaged, the structure becomes very sturdy with respect to mechanical and/or thermal shocks.

Figure 3:
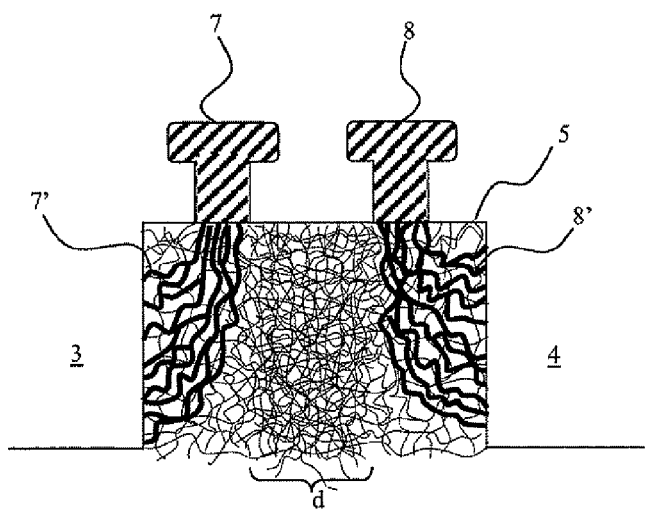
FIG. 3 is an enlarged illustration of the functional integrated fuel cell structure of the invention.

FIG. 3 is an enlarged illustration of the functional cell structure, practically realized in the longitudinal ridge portion 5 of the porous oxidized silicon skeleton of definition of the two lateral feed channels 3 and 4.

The illustration replicates as an enlarged detail view the central ridge 5 of nonconductive oxidized porous silicon 5, the two solid metal cell electrodes 7 and 8, the electrolytically grown catalytic metal threads 7' and 8' stemming from the respective bottom surfaces of solid metal electrodes 7 and 8 and grown to finally reach the definition side face of the nonconductive oxidized porous silicon skeleton of the ridge 5.

The threads 7' and 8' are grown through the open voids of the nonconductive oxidized silicon skeleton toward a polarizing counterelectrode (anode) immersed or in contact with the electrolytic solution of the catalytic metal are galvanically deposited.

The growth of the uninterrupted catalytic metal threads 7' and 8' does not preclude completely the voids through which they extend except in the initial growth and ramification zone immediately adjacent to the bottom surface of respective solid metal electrodes 7 and 8.

As rendered by the dense hatching representing the oxidized porous silicon skeleton of the ridge 5 that, as observable as being denser in the innermost central portion of the porous oxidized silicon skeleton of the ridge 5, compared to the progressively sparser hatching upon approaching the definition side face of the ridge 5, the dopant implant conditions and/or of the subsequent electrochemical erosion and/or of the final wet chemical etching after having oxided the residual silicon skeleton, favor the constitution of pores of relatively smaller size and enhanced twisted or crookedness, in the central portion of the ridge 5. This is compared to a progressively decreasing twisted or crookedness, and progressively increasing size of the pores upon approaching the definition side face of the ridge 5.

When finally impregnating the oxidized porous silicon of the region 2 with a resin (or precursor) solution, a practically complete filling and sealing of the relatively fine porosity of the central portion of the ridge 5 is achieved. This is while the pores that open on the definition side face, some of which may already contain a galvanically grown thread of catalytic metal, and those relatively near the side surface, are only partly filled with the resin. This leaves at and immediately beneath the side definition surface of the central ridge 5 innumerable three-phase sites that are reached by the reactant fluid fed into or circulated along the relative channel.

In contrast, the substantially complete filling by the resin of the finer porosity in the central portion of the ridge 5 of oxidized porous silicon skeleton seals the pores preventing any possibility of intermixing of the fuel fed in the anodic distribution channel 3 with the air stream or other oxygen containing mixture circulated through the cathodic distribution channel 4.

The solid metal cell electrodes 7 and 8 are connected to an external load circuit of the cell to support the half-cell reactions at the anode 7' and at the cathode 8' of the fuel cell.

The migrating ion, typically protons ($H^+$) that are generated at three-phase sites of the dispersed anode structure 7' migrate in the cation exchange resin, driven by the developed cell voltage to eventually reach a three-phase site on the dispersed cathodic structure 8', where their combination with oxygen to form water molecules takes place.

Excess moisture is promptly removed from the active three-phase sites of the cathodic structure 8' by the streaming airflow forced through the cathode feed channel 4. Water flooding of would-be active three-phase sites of the porous cathodic structure 8' must be prevented as much as possible and this is commonly promoted by modulating the hydrophobic/hydrophilic character of the composite porous cathode structure that in this regard may be considered not only formed by the electrically conductive catalytic metal threads 8' but also by the ion permeable resin in contact therewith and, in a prevalent measure, also by the surface of the oxidized silicon skeleton of the composite porous structure. Silanes applied onto the oxidized silicon skeleton may be used for adjusting the hydrophobicity of the surface, prior to the formation of the catalytic metal threads and impregnation with the cation exchange resin.

Figure 4:
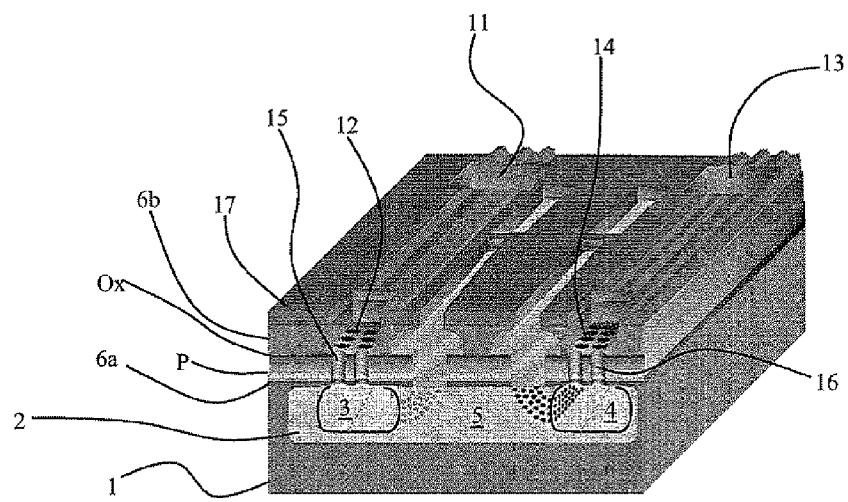
FIG. 4 is a three-dimensional partial cut-away view of a fuel cell structure according to an alternative embodiment of the invention.

FIG. 4 is a three-dimensional cut-out simplified illustration of a planarly integrated fuel cell realized with an alternative embodiment of the fabrication process, allowing for the formation of the two parallel buried channels 3 and 4 by carrying out a wet etch, highly selective toward the oxidized porous silicon, after the region 2 has been covered by a first dielectric multilayer stack 6a and by a layer of polysilicon P, through which distinct pluralities of holes 15, 16, are formed in longitudinally defined parallel areas. They geometrically overhang the longitudinal parallel channels 3 and 4 to be formed in the buried region 2 of oxidized porous silicon underneath.

Inlet and outlet apertures 11-12 and 13-14, formed through the second topping dielectric stack 6b and the plugging dielectric layer 17 that seal the top portion of the etch holes 15 and 16, reaching down to the holed areas of the polysilicon layer, provide access to the two distinct flow channels 3 and 4 of the planarly integrated fuel cell structure for circulating therethrough the respective reagent fluids.

Micro fuel cell structures of this invention may be formed on planar silicon wafers commonly used in the semiconductor industry, made by either the CZ (Czochralski) or FZ (Floating Zone) techniques. Silicon wafers of any lithographic orientation (<100>; <111>; etc.) and not necessarily with double lapping grade can be used for a sensible reduction of the cost of the starting wafer.

The maximum roughness should be less than at least an order of magnitude compared to the minimum dimension to be lithographically defined. The thickness of the wafer, generally from 50 up to 500 μm will depend on geometry and from therefore from the type of application to which the fuel cell is destined.

The starting wafer may be doped with p-type dopants or with n-type dopants with a total concentration that may generally be between $1e^{13}$ and $5e^{20}$, per cubic centimeter. In case the starting wafer is $n^-$ doped an epitaxial growth of an $n^+$ layer of a thickness generally comprised between 1 μm and 200 μm, depending on the application, will be carried out.

Figure 5:
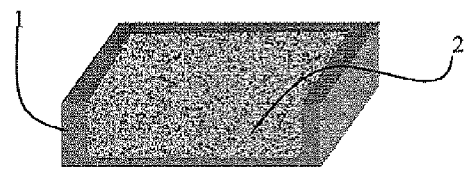

The process of fabrication will now be described with reference to the figures. In FIG. 5, a fundamental starting step is the formation in the monocrystalline silicon substrate 1 of a region 2 of porous silicon residue by electrochemically eroding the crystalline silicon in an aqueous hydrofluoric acid solution of concentration generally comprised between 1% and 40% by weight. This may optionally be with the addition of a surfactant, for example acrylic or isopropylic alcohol, dymetil sulfoxide, and similar compounds.

Preferably, the average pore size of the porous silicon residual structure (porous silicon skeleton) is not uniform along a transversal direction, but the formation of relatively larger pores is favored alongside a narrow central strip region where the porosity should remain relatively fine (i.e., with pores of small dimensions and enhanced twisted or crookedness). This may be promoted in different ways, the implementation of which is intuitive for a skilled practitioner.

One way is the concentration of dopants in this central narrow strip region can be kept lower than the concentration in the rest of the region 2 or in two side strips flanking such a narrow central strip, by using an overimplant mask.

Another way is that the effective current density of the subsequent electrochemical erosion of the doped region 2 can be made locally less intense in the narrow central strip region by the use of a dielectric hard mask of silicon nitride centered over the innermost central strip region to cause a distortion of electric field lines and a progression of the erosion that "undercutting" paths.

Yet another way is a final wet etch following the formation of the parallel channels by dry etch, to "enlarge" the superficial pores and those immediately near to the channel definition wall (as will be described later).

At the end of the process, the region 2 will be constituted by a residual silicon skeleton with a significant open pore void ratio that renders the porous silicon mass of the region 2 pervious to fluid flow along any spatial direction.

Figure 6:
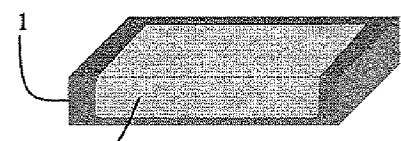

In FIG. 6, the wafer is subjected to an oxidation treatment in an oven (either in wet or dry mode). Given the comparably large surface area of the porous silicon skeleton of the region 2, that is generally on the order of several hundreds square meters per cubic centimeter and its enhanced reactivity because of the surface roughness and porosity of the crystalline silicon residual skeleton, the oxide growth will proceed at a far greater rate in the region 2 than over the substrate 1. A substantial oxidation of the skeleton of residual crystalline silicon constituting the porous region 2 makes the porous mass of oxidized silicon electrically nonconductive, and therefore practically isolated from the surrounding monocrystalline solid silicon of the substrate 1.

Figure 7:

In FIG. 7 a first dielectric stack 6a that may include $SiO_2$, TEOS $Si_3N_4$ silicon oxynitride or equivalent dielectrics, is formed over the silicon wafer 1 to form a stack of a total thickness that may generally be comprised from 0.01 to 2 or more μm. The first dielectric stack will serve as a hard mask for successive etchings.

The techniques of deposition of the multilayered dielectric stack are those commonly used, such as chemically vapor deposition (CVD), low pressure chemical vapor deposition (LPCVD), plasma assisted chemical vapor deposition (PCVD) or equivalent techniques.

Figure 8:
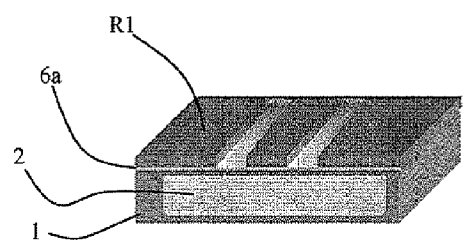

In FIG. 8 the next step is the formation of a first resist mask R1 defining two parallel tracks over the region 2 for each device being fabricated, and scribe lines (not shown) for automatically recognizing the borders of the distinct chips being fabricated when finally cutting the wafer in dices that may contain one or several integrated fuel cells.

Figure 9:
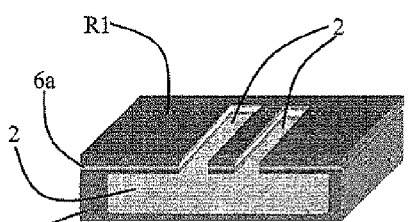

In FIG. 9 the selective anisotropic dry etching of the dielectric hard mask stack 6a conducted through the parallel openings of the resist mask R1 will expose the surface of the oxidized porous silicon skeleton of the region 2 underneath. The etchants of the dielectric layers of hard mask will be chosen depending on the type of dielectric material deposited, commonly: buffered hydrofluoric acid or $CF_4$ and $H_2$ for oxides and $H_3PO_4$ for nitrides.

Figure 10:
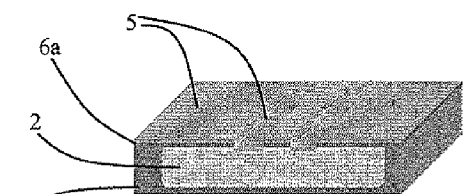

In FIG. 10, after having removed the resist mask R1, matching stacked layers of Ti—TiON—Ti, with a total thickness in the order of 10000-40000 nm, and a topping flash sputter deposition of gold are deposited over the whole surface of the wafer to serve as a conductive seed layer s for successively forming solid gold electrodes by electroplating.

Figure 11A:
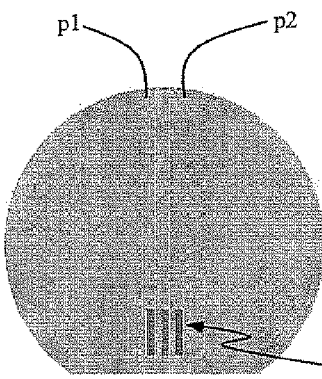
Figure 11B:
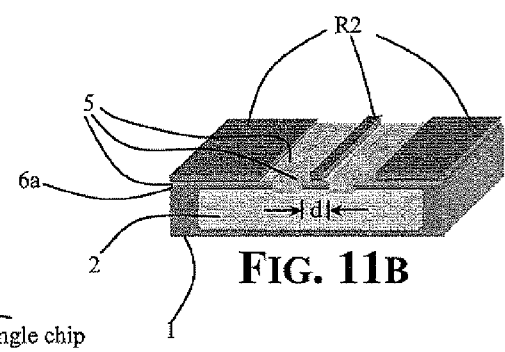

In FIG. 11a, 11B the features so far realized, with the exception of the formation of a metallic stack and gold seed layer, are distinctly reproduced on each of the many devices being formed. For maximizing utilization of the wafer, patterns may be replicated along parallel strips or along a spiraling strip, or according to any other geometrical arrangement.

As depicted in FIG. 11B, a second resist mask R2 is formed for defining the electrodes (anode and cathode) of each integrated fuel cell device. The simplified layout view of the wafer of FIG. 11A indicates the location of one unit chip. The resist mask R2 will also define two end pad areas p1 and p2 that will permit one to cathodically polarize the metallic seed layer stack s.

As observable in the detail view of FIG. 11B, the mask R2 defines the width of conductive solid gold electrodes to be formed onto the exposed areas of the two parallel tracks of each device coated with the electrically conductive gold seed stack s present over the underlying oxidized silicon porous skeleton 2 and alongside over the narrow exposed edge portion of the dielectric hard mask stack 6a. The definition width of the solid gold electrodes may be from the lithographic limit (e.g. 0.18 μm) up to few millimeters, depending on the design.

The distance of separation d between the two parallel solid metal electrodes and of the underlying innermost central region of the porous oxidized silicon region 2, in which the pores will be filled completely by the ion exchanging resin to hydraulically separate the anodic and cathodic fluids, may be from about 10 μm up to about 500 μm, depending on the design.

Figure 12A:
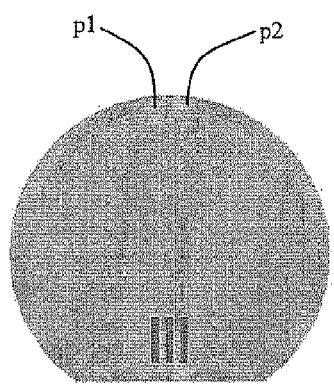
Figure 12B:
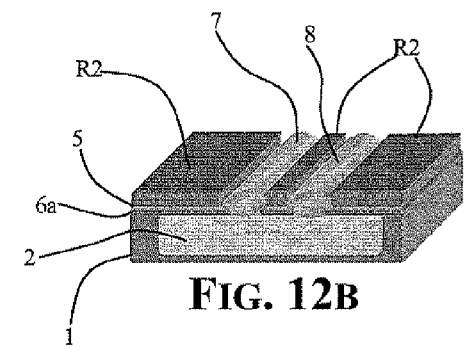

FIGS. 12A and 12B refer to the electroplating step for forming the defined parallel anode and cathode of the cell being fabricated in the detailed unit cell. The wafer is introduced in an electrode position cell with only the portion of the masked surface where the unit devices are defined, in contact with an electroplating solution containing gold. The two end pads p1 and p2, defined near the edge of the wafer, are both connected to the negative pole of a DC supply for cathodically polarizing the conductive seed metal stack s relatively to an anodically polarized positive voltage counterelectrode of the electroplating cell (typically of platinum).

By applying a sufficiently high voltage to the cell, gold ions will be cathodically reduced to metallic form and deposit on the cathodically polarized surfaces, as defined by the resist mask R2, over the parallel trench areas of the devices being fabricated and electrode position will be continued until growing solid gold electrodes up to a thickness, generally from 50000 nm up to few μm, depending on the design, as illustrated in the detail view of FIG. 12B.

The growth of the gold deposit fills the parallel trenches defined by the resist mask R2, assuming a mushroom cross-sectional shape.

Figure 13:
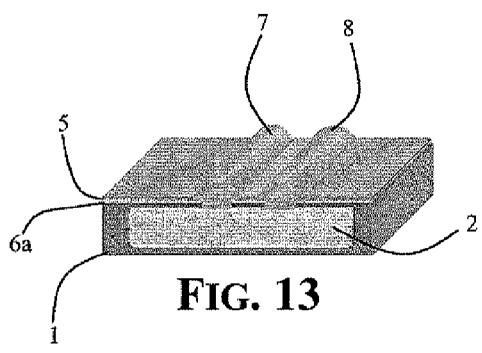
Figure 14:
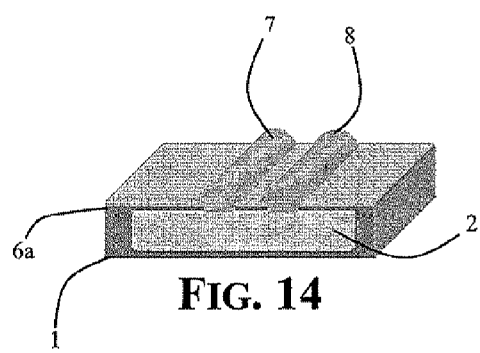

FIG. 13 shows the structure after having removed the resist mask R2. FIG. 14 illustrates that the thin interfacing Ti—TiON—Ti and gold seed multilayer stack s is removed from the planar surface of the dielectric stack 6a by immersing the relevant portion of the wafer (sparing the metallized pad areas p1 and p2 near the edge) in a solution of hydrochloric and nitric acid. The wet etching of the metallic multilayer stack s will not substantially affect the much thicker parallel electrodes 7 and 8 of solid electroplated gold, leaving the structure shown in the figure.

Figure 15:
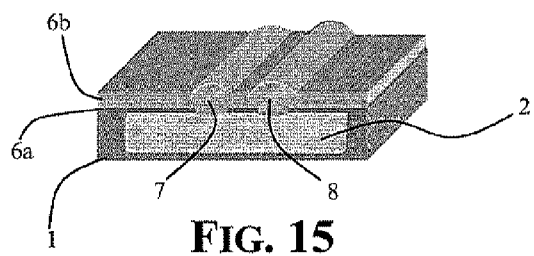

In FIG. 15, the fabrication process contemplates at this stage the deposition under conditions of enhanced conformity to the underlying surface of a passivating dielectric layer 6b, for example of a p-glass, a TEOS or a SOG layer, by low temperature CVD, LPCVD or PECVD, in order to planarize the surface of the wafer for subsequent photolithographic steps. Depending on the height of the plated gold electrodes 7 and 8, the thickness of this conformally deposited dielectric layer 6b may be from about 50000 nm up to about 10 μm.

In FIGS. 16A and 16B a third photoresist mask R3 is formed for defining anode and cathode contact areas on the respective plated gold electrodes 7 and 8 of each device being fabricated and opening again the metallized edge pad areas p1 and p2 electrically connected to respective pluralities of parallel gold electrodes of the distinct devices being fabricated, connectable to a DC source for performing successive electroplating steps.

In FIG. 17 the etching of the dielectric passivating layer 6b through the openings of the third resist mask R3, opens electrically connectable pad areas on the plated gold electrodes (the gold will provide for end points of the plasma etch). Thereafter, the resist mask R3 is removed.

In FIG. 18 the geometries of the pair of parallel channels that will constitute the flow compartments for feeding a fluid fuel to the active anode structure and the air or oxygen containing gaseous mixture to the active cathode structure of the cell are defined by a fourth resist mask R4.

The width and depth of the channels will depend on the flow rate of the respective fluids. This is while the length of definition of the integrated fuel cell will be determined by the design current delivering capability of the cell, taking into account the maximum design current density supported by the fuel cell structures. The lengthwise dimension determines the (apparent or geometric) cell area of the single integrated fuel cell (given a certain design depth of the channels).

In FIG. 19, through the openings of the resist mask R4, first the dielectric passivating layer 6b and the underlying first dielectric stack 6a are etched. Thereafter, the exposed underlying oxidized porous silicon skeleton 2 is dry or wet etched or through a combination of dry and wet etching steps, depending on the cross sectional shape and dimensions that the parallel channels 3 and 4 to be formed alongside the respective anode 7 and cathode 8 need to have.

In case of a dry etch of the oxidized porous silicon skeleton 2, the cross-sectional of shape of the channels 3 and 4 will be practically rectangular by virtue of the anysotropicity of the etching, whereas, in case of wet etching, the channels will assume a substantially circular (undercut) cross section, by virtue of the isotropy of the etching. The reagents used are, in case of dry etch gaseous mixtures of $CHF_4$ and $H_2$, and in case of a wet etch an aqueous solution of hydrofluoric acid of variable concentration.

At the end of the etch, the two parallel channels 3 and 4 will be separated by a central ridge portion 5 of oxidized porous silicon skeleton 2.

As already stated, in case of a dry etch, after having formed the two parallel channels of the desired dimensions, a final brief isotropic wet etch with an aqueous solution of hydrofluoric acid may be performed for enlarging the pores that open on and those immediately near the definition walls of the channels, for the reasons already discussed.

In FIGS. 20A and 20B, generally the catalytic anode and cathode structures of the fuel cell will be formed separately and of different catalytic metals. For the formation of a dispersed active cathode structure, the wafer, still carrying the residual resist mask R4 thereon, is immersed in an aqueous and/or alcoholic solution of a complex salt of a catalytic nonpassivable (noble) metal particularly suited to constitute the active cathode structure of the fuel cell chosen in the group composed of platinum, iridium, ruthenium, rhodium and palladium. Any commonly employed cathodically reducible soluble compounds of the selected noble metal (for example $[Pt(NH_3)4](OH)2-xH_2O)$ may be used. Beside platinum, iridium and ruthenium are other commonly preferred cathode catalysts.

The concentration of noble metal in the solution may vary from 0.1 to 3.0% by weight of an aqueous solution buffered with ammonia up to a strongly basic pH (for example to pH 9).

By connecting through the edge pad p2 the solid metal cathode 8 to the negative pole (0V) of the DC source, a Pt counterelectrode to the positive pole (+V1) of the DC source and by biasing to an intermediate positive voltage (+V2), insufficiently lower than +V1 to reduce the metal ions, the solid gold anode 7, thus substantially prevents cathodic reduction of the noble metal ions thereon. Uninterrupted threads 8' of cathodically deposited catalytic metal are grown in the voids of the insulating oxidized porous silicon ridge 5, stemming from the metallic bottom surface of the cathodically polarized gold cathode 8 of the cell.

The growth of innumerable threads 8' is driven by the mechanism of reduction of the noble metal ions and deposition of the metal at the end tip of each growth thread, by virtue of electric field lines concentration (point effects).

The sideway direction of growth of the uninterrupted electrically conductive threads 8' of catalytic metal, indicated by doted lines in FIG. 20A, is promoted by anodically polarizing the other gold electrode 7 of the fuel cell structure at a potential (+V2) sufficiently high to prevent reduction of the noble metal ions onto the bottom face of the gold electrode 7 of the integrated fuel cell structure.

Under these spatially orienting bias conditions and by forcing a relatively high current, a denditric-like growth is promoted locally in the region of the central ridge 5 of oxidized porous silicon skeleton directly underneath the solid gold electrode 8 and toward the side face of definition of the central ridge portion 5, constituting a side wall of the cathode feed channel 4.

The threads 8' start growing onto the bottom metallic surface of the solid gold cathode 8, they progressively and repeatedly branch out through the interconnected pores of the oxidized silicon skeleton 2 and rapidly extend as far as reaching the side face of definition of the central ridge 5 of the oxidized porous silicon skeleton.

Apart from the region immediately underneath the originating bottom surface of the solid metal cathode 8, the threads 8' will progress through the open porosity without substantially filling the voids though remaining mechanically sustained by the oxidized silicon skeleton at multiple bearing points along the path of growth toward the anodically polarized (+V1) counterelectrode of the electroplating cell.

Once the growth of the catalytic metal threads 8' has progressed to the point of having a large number of threads reach the side face of definition of the ridge 5 constituting the side wall of the cathode feed channel 3, the wafer is removed from the bath, rinsed in $H_2O:NH_3:H_2O_2$, in relative weight ratios of 10:1:1, and successively in a solution of $H_2O:HCL:H_2O_2$ in relative weight ratios 10:1:1. Thereafter, the wafer is further rinsed with deionized water of a rotation speed of 500 RPM for a few minutes and dried in a hot nitrogen stream for five minutes or longer.

In FIGS. 21A and 21B the processing described with reference to FIGS. 20A and 20B for forming the dispersed active cathode structure is repeated for forming the dispersed active anode structure.

As depicted, the solid gold anode 7 is now connected to the negative (0V) pole of the DC source and the cathode structure (8 +8') is now connected to an intermediate positive voltage (+V2) sufficiently high to prevent cathodic reduction of the ions of the catalytic metal selected for forming the uninterrupted threads 7' of the dispersed active anode structure of the integrated fuel cell. Platinum is commonly selected as the anode catalyst.

With respect to catalyst drying, the wafer is dried under vacuum to remove any residual solvent that may have been absorbed in the oxidized porous silicon skeleton. Thereafter, the wafer may be subjected to a heat treatment in a stream of oxygen and nitrogen, raising the temperature from room temperature to about 400° C., at a rate of few degrees per minute. After remaining at 400° C. for about an hour, the wafer is slowly cooled back to room temperature.

With respect to catalyst activation the wafer may then be subjected to a heat treatment in hydrogen. The temperature is raised at a rate of about 30° C. per minute up to reach a temperature of about 400° C. The wafer is maintained at 400° C. in hydrogen atmosphere for about two hours. The process will practically destroy any native oxide film that may have formed on the surface of the catalytic metal threads during the preceding heat treatments.

With respect to surface conditioning, hydrophobicity/hydrohilicity of the surface of the porous skeleton of oxidized silicon 2 may be adjusted depending on whether the liquid ion exchange resin precursor with which the porous fluid pervious skeleton of oxidized silicon will be impregnated, If the fluid resin solution has a polar character, the oxidized silicon surface may be preferably treated to enhance hydrophilic. Vice versa, if the resin precursor fluid is not polar, the surface of the oxidized silicon surface may be treated to enhance its hydrophobicity by absorbing in the oxidized porous silicon a silane. For example, the wafers may be contacted with a silane with functional groups such as for example APTMS, GOPS or a fluorinated silane dissolved for example in toluene in a 0.1% by weight concentration. The silane will be absorbed in the oxidized silicon modifying the wettability of the surface.

The impregnated silane is dried by heating the wafer from room temperature up to about 130° C. at a rate of few degrees per minute in an oxygen and nitrogen stream for completely evaporating the solvent. After keeping the substrate at 130° for another thirty minutes, the wafer is slowly cooled back to room temperature.

FIG. 22 refers to FIG. 22 ion permeable resin impregnation. The wafer is immersed in a commercial solution of a suitable ion selective resin, for example in commercial cation selective liquid Nafion® (DuPont de Nemours). The liquid will permeate the interstices of the oxidized porous silicon skeleton. This is by virtue of the finer porosity (pores of relatively smaller size) of the innermost central portion of the ridge 5 of porous oxidized silicon, by capillarity a practically complete filling of the fine pores of the innermost portion of width d (FIG. 3) takes place while, upon extracting the wafer from the bath of impregnation and draining the excess resin solution, the superficial voids on the definition side surfaces of the channels 3 and 4 will be substantially emptied of resin and so will be, though to lesser and lesser extent, also the pores of relatively larger size than the finer pores of the innermost portion d, at increasing distance from the definition side face of the central ridge 5.

With respect to polymer curing, after having drained the excess resin solution, the wafer is dried at room temperature allowing for the evaporation of the solvent. The wafer is then subjected to heat treatment under vacuum, raising the temperature from room temperature up to about 130° C., at a rate of about 5° per minute, The wafer is kept at 130° C. for further thirty minutes and then slowly cooled to room temperature.

In FIG. 23 the resulting structure, after having removed the mask R4, is as depicted. At this point, the integrated micro fuel cell structure, as described with reference to the stylized illustration of FIG. 3, can be considered completed.

FIG. 24 is the sealing of feed channels. According to the above-illustrated process, at this stage of fabrication, the micro fuel cell, as integrated on the silicon substrate, has its feed channels 3 and 4 open at the surface of the wafer. There are several alternative ways of separately closing the feed channels of each device (dice cut from the wafer).

A first approach is based on bonding the dice to an external capping body B that may be of glass or plastic, practically realizing the separate closing of the channels 3 and 4 and their connectability to respective external microfluidic circuits in the package.

An external sealing cap B of glass or plastic is first machined with appropriate techniques (ultrasonic, laser, photostructuring) for forming inlet and outlet holes and for opening contact areas on the gold electrodes of the cell for connecting the active anode and the cathode structures of the integrated fuel cell to the external load circuit. The bonding of the cap onto the silicon surface (in alignment with the integrated fuel cell devices) may be carried out according to commonly used techniques with or without the use of bond layers between the silicon substrate and an eventual glass cap such as a resist.

According to an alternative embodiment of the process of fabrication, the feed channels 3 and 4 of each fuel cell device may be already formed in a substantially buried fashion for simplifying the final packaging of the finished device, practically eliminating the need of closing the channels with a precisely matching separately fabricated cap.

The distinguishing steps of the fabrication process according to this alternative embodiment are described below.

FIG. 25 refers to polysilicon deposition. The fabrication steps are the same up to the formation of the first dielectric stack of hard mask 6a over the wafer surface already illustrated in FIG. 7.

According to this alternative embodiment, a layer of few μm of polysilicon P is deposited over the dielectric hard mask stack 6a, under conditions that will ensure thickness non-uniformities contained within 5% of the thickness. The deposition is generally conducted at a temperature between 600° C. and 650° C., at low pressure, generally in the range of 0.1-0.2 Torr, employing a mixture obtained from 20% to 30% by volume of silane in nitrogen.

In FIG. 26 a first resist mask R1 is formed on the surface of the wafer for defining the parallel strips for the cell electrodes and the scribe lines for automatically recognizing the orders of the distinct chips being fabricated when cutting the wafer in dices.

Through the mask in FIG. 27, the polysilicon layer P first and thereafter the dielectric hard mask stack 6a are dry etched with an end point provided by the exposed oxidized porous silicon 2.

The etchants used for the polysilicon and for the dielectric hard mask 6a are respectively a gaseous mixture of sulphur hexafluoride and chlorine ($SF_6+CL_2$) and a mixture of carbon tetrafluoride and hydrogen ($CF_4+H_2$) for the dielectric hard mask stack 6a.

Figure 28:
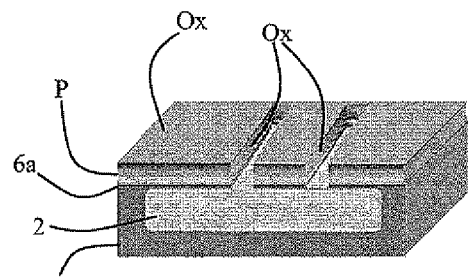

FIG. 28 refers to oxidation of the polysilicon. After removing the first mask of resist R1 by dissolving it in acetone and rinsing the wafer with dionized water under 500 RPM spin for about three minutes, the wafer is dried in a nitrogen stream for about 5 minutes. Thereafter, the wafer is heat treated in an oven in order to grow a layer of native oxide Ox over the surface of the polysilicon layer P.

The native oxide Ox grown on the surface may have a thickness of about 20000 nm and will be coated conformally all surfaces of the polysilicon thus covering also the vertical walls of the parallel trenches formed therethrough.

Figure 29:
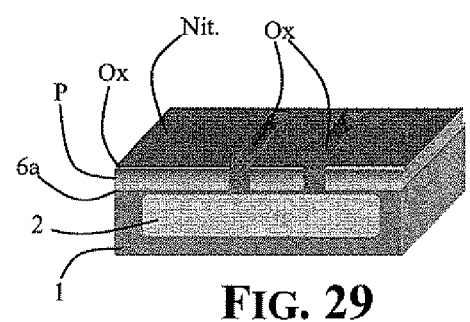

In FIG. 29 a dielectric layer of silicon nitride ($Si_3N_4$) Nit. of a thickness of about three times the thickness of the oxide Ox grown over the surfaces of the polysilicon P is conformally deposited over the wafer. The thickness will therefore be about 60000 nm.

Figure 30:
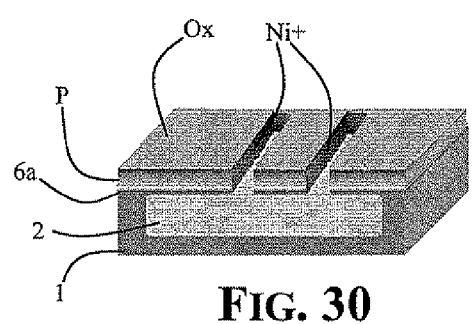
Figure 31:
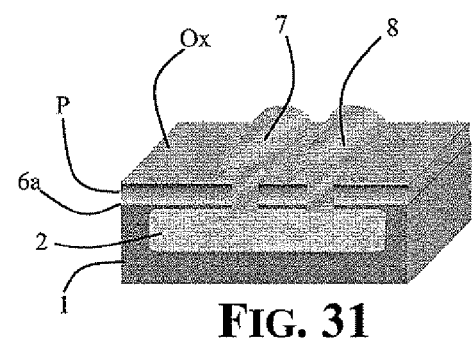

In FIGS. 30 and 31 a planarizing blanket dry etch of the nitride with end point on the silicon oxide Ox grown on the polysilicon P is carried out. Therefore, the nitride layer Nit. will remain only on the vertical walls of the parallel trenches cut through the polysilicon and the underlying dielectric stack 6a, to constitute dielectric spacers. Of course, the nitride will also be removed from the top of the oxidized porous silicon of region 2, and on the bottom of the trenches.

Thereafter, the fabrication process may proceed through the same steps already described with reference to the FIGS. 10 to 14.

The wet etching of the adhesion and seed layer Ti—TiON—Ti+Au, in a hydrochloric acid and nitric acid solution will not remove the oxide layer grown on the surfaces of the polysilicon P, thus ensuring electrical isolation between the two parallel gold electrodes 7 and 8 of the integrated fuel cell structure, as depicted in FIG. 31.

Figure 32:
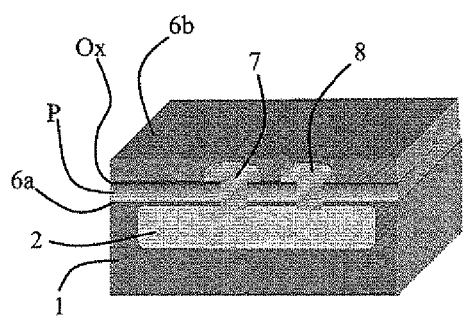

In FIG. 32, over the oxidized planar surface of the polysilicon P and over the gold electrodes 7 and 8, a second multilayered dielectric stack 6b is deposited for ensuring a substantial planarization of the surface of the wafer. The total thickness of the second dielectric stack 6b will depend on the height of the gold electrodes, and may therefore be of about 1 to 2 μm. The dielectric layers may be of PECWD or PTEOS or BSG or SOG or a silicon oxynitride.

Figure 33:
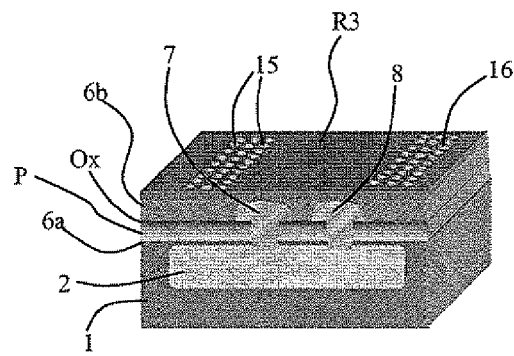

In FIG. 33, a third resist mask R3 is formed for defining parallel strips of closely spaced holes 15 and 16, sideway of one and the other, respectively, of the two parallel gold electrodes 7 and 8. The two strips of closely spaced holes are defined geometrically above the regions of formation of the two parallel feed channels (anode and cathode compartments) of the integrated fuel cell structure.

Figure 34:
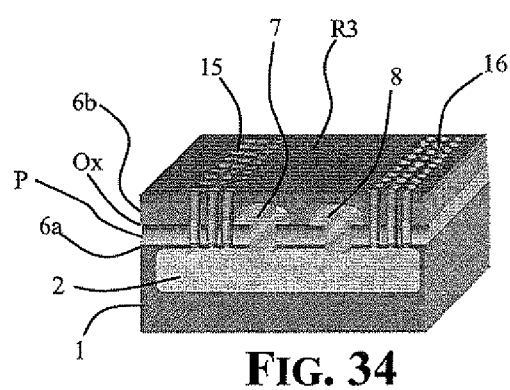

In FIG. 34, through the holes 15 and 16 mask R3 a dry etch of the underlying dielectric stack 6b is first carried out with end point on the polysilicon P underneath, using a gaseous etchant mixture of carbon tetrafluoride and hydrogen.

Thereafter, the dry etch of the polysilicon is carried out with end point on the oxidized porous silicon of region 2, using a gaseous mixture of sulphur hexafluoride and chlorine.

In FIGS. 35A and 35B the oxidized porous silicon skeleton 2 is selectively wet etched in substantially isotropic conditions of progression of the etching of the oxidized silicon skeleton.

As graphically shown in FIG. 35A, the leaching away of the oxidized porous silicon skeleton 2 at the base of the holes 15 and 16 of the respective parallel strip areas and the etching progresses as far as forming two parallel buried channels 3 and 4 having a somewhat circular cross section. The wet etching is conducted using a diluted hydrofluoric acid solution in water with a weight ratio of about 1:20.

The etching of the oxidized porous silicon structure 2 will be highly selective versus other dielectrics such those composing the hard mask stack 6a. This is because these dielectric materials have a much more compact structure than the oxidized porous silicon skeleton of the region 2 that, having a spongy morphology derived from the electroerosion process renders the oxidized residue highly reactive, and therefore, rapidly leached away by the hydrofluoric acid solution.

In FIG. 36 after having removed the resist mask R3, the holes 15 and 16 that were formed for permitting the formation of buried parallel channels 3 and 4, defining a central ridge portion 5 therebetween of oxidized porous silicon 2, after rinsing and drying the wafer, are sealed by depositing a dielectric material 17, generally $SiO_2$, $Si_3N_4$, BPS, or the like, under conditions of moderately conformal deposition until securely plugging the top portion of the holes 15 and 16.

The deposition may be carried out by any of the commonly used techniques of CVD, LPCVD, PCVD and/or plasma deposition. The thickness of the deposited plugging layer 17 of dielectric will depend on the diameter of the holes 15 and 16 to be plugged.

In FIGS. 37A and 37B, with a fourth resist mask R4 contact pad areas for the anode and cathode are opened over the parallel gold electrodes 7 and 8 of each individual device as illustrated in the wafer layout view of FIG. 35A and in the detail sectional three-dimensional view of FIG. 35B. This also includes inlet and outlet to and from the respective buried channels 3 and 4 by etching through the dielectric stack composed by the pore plugging layer 17, the underlying second dielectric stack 6b and the native oxide Ox over the polysilicon layer P that will provide for the N point of the etch in the inlet and outlet area.

After removing the last resist mask R4, the wafer is cleaned in acetone and then rinsed in dionized water at about 500 RPM for three minutes. The wafer is thereafter dried in a hot nitrogen stream for about five minutes.

The fabrication process may then continue through the same steps of formation of the catalytic metal threads of the dispersed active anode and cathode structures, and the subsequent resin impregnation and curing steps as already described in relation to FIGS. 20A and 20B and to the polymer curing step.

That which is claimed:

1. A planarly integrated fuel cell comprising:
 a monocrystalline silicon chip including an oxidized porous silicon region preliminarily rendered porous and permeable to fluids and is electrically non-conductive;
 at least one pair of parallel channels comprising an anode feed channel and a cathode feed channel extending in the oxidized porous silicon region, said at least one pair of parallel channels defining a central oxidized porous silicon ridge therebetween;
 a dielectric cap over said at least one pair of parallel channels and having inlet and outlet holes formed therethrough in correspondence to opposite ends of said at least one pair of parallel channels for separately circulating a fluid fuel in the anode feed channel and air or other oxygen containing mixture in the cathode feed channel;
 a pair of parallel metal electrodes extending over said central oxidized porous silicon ridge and extending a length of said at least one pair of parallel channels;
 cathodically deposited uninterrupted electrically conductive threads of a catalytic metal, stemming from a bottom surface of each of said metal electrodes and extending to a side face of said central oxidized porous silicon ridge defining a side wall of a respective channel extending alongside of the electrode;
 ion permeable resin filling the pores in an innermost central portion of said central oxidized porous silicon ridge to impede fluid flow from one channel to the other, and partly filling the pores in proximity of the sides of said central oxidized porous silicon ridge defining the side walls of the respective channels, and forming uninterrupted ion permeable resin domains extending from the catalytic metal threads stemming from one metal electrode to the catalytic metal threads stemming from the other metal electrode; and a connector for electrically connecting said pair of parallel metal electrodes to an external load circuit of the integrated fuel cell.

2. The planarly integrated fuel cell according to claim 1, wherein said dielectric cap is a separately fabricated element with respect to said monocrystalline silicon chip.

3. The planarly integrated fuel cell according to claim 1, wherein said dielectric cap comprises a first multilayered dielectric stack and an electrically isolated polysilicon layer forming a hard mask having a plurality of holes for forming by wet etch said at least one pair of parallel channels, and a top dielectric layer plugging the plurality of holes through the underlying polysilicon layer and a dielectric stack of a hard mask, except in correspondence to the inlet and outlet holes.

4. The planarly integrated fuel cell according to claim 1, wherein said central oxidized porous silicon ridge has an innermost central portion, underneath a separation gap between said parallel metal electrodes having pores of smaller average size than pores at and near the side faces thereof defining side walls of the respective channels.

5. The planarly integrated fuel cell according to claim 1, wherein said ion permeable resin comprises a cation exchange resin that fills the pores in said central oxidized porous silicon ridge when in a liquid form, and is then cured after evaporating the solvent.

6. An integrated fuel cell comprising:
a monocrystalline silicon chip comprising an oxidized porous silicon region;
a pair of parallel channels in said oxidized porous silicon region and comprising an anode feed channel and a cathode feed channel, said pair of parallel channels defining a central oxidized porous silicon ridge therebetween;
a dielectric cap over said pair of parallel channels and having inlet and outlet holes formed therethrough in correspondence to opposite ends of said pair of parallel channels for separately circulating a fluid fuel in the anode feed channel and an oxygen containing mixture in the cathode feed channel;
a pair of parallel electrodes extending over said central oxidized porous silicon ridge and extending a length of said pair of parallel channels;
electrically conductive threads stemming from a bottom surface of each of said electrodes and extending to a side face of said central oxidized porous silicon ridge defining a side wall of a respective channel extending alongside the electrode;
ion permeable resin filling the pores in an innermost central portion of said central oxidized porous silicon ridge to impede fluid flow from one channel to the other, and partly filling the pores in proximity of the sides of said central oxidized porous silicon ridge defining the side walls of the respective channels, and forming uninterrupted ion permeable resin domains extending from the electrically conductive threads stemming from one electrode to the electrically conductive threads stemming from the other electrode; and
a connector for electrically connecting said pair of parallel electrodes to an external load circuit.

7. The integrated fuel cell according to claim 6, wherein the electrically conductive threads comprise at least one of platinum, iridium, ruthenium, palladium, rhodium and alloys thereof.

8. The integrated fuel cell according to claim 6, wherein said dielectric cap is a separately fabricated element with respect to said monocrystalline silicon chip.

9. The integrated fuel cell according to claim 6, wherein said dielectric cap comprises a first multilayered dielectric stack and an electrically isolated polysilicon layer forming a hard mask having a plurality of holes for forming said pair of parallel channels, and a top dielectric layer plugging the plurality of holes through the underlying polysilicon layer and a dielectric stack of a hard mask, except in correspondence to the inlet and outlet holes.

10. The integrated fuel cell according to claim 6, wherein said central oxidized porous silicon ridge has an innermost central portion, underneath a separation gap between said pair of parallel electrodes, and has pores of smaller average size than pores at and near the side faces thereof.

11. The integrated fuel cell according to claim 6, wherein said ion permeable resin is initially in a liquid form for filling the pores in the innermost central portion of said central oxidized porous silicon ridge, and is then cured after evaporating the solvent.

12. A process for fabricating a planarly integrated fuel cell comprising:
forming an oxidized porous silicon region in a monocrystalline silicon chip, the oxidized porous silicon region being preliminarily rendered porous and permeable to fluids and being electrically non-conductive;
forming at least one pair of parallel channels comprising an anode feed channel and a cathode feed channel extending in the oxidized porous silicon region, the at least one pair of parallel channels defining a central oxidized porous silicon ridge therebetween;
forming a dielectric cap over the at least one pair of parallel channels and having inlet and outlet holes formed therethrough in correspondence to opposite ends of the at least one pair of parallel channels for separately circulating a fluid fuel in the anode feed channel and air or other oxygen containing mixture in the cathode feed channel;
forming a pair of parallel metal electrodes extending over the central oxidized porous silicon ridge and extending a length of the at least one pair of parallel channels;
cathodically depositing uninterrupted electrically conductive threads of a catalytic metal, stemming from a bottom surface of each of the metal electrodes and extending to a side face of the central oxidized porous silicon ridge defining a side wall of a respective channel extending alongside of the electrode;
filling the pores with ion permeable resin in an innermost central portion of the central oxidized porous silicon ridge to impede fluid flow from one channel to the other, and partly filling the pores in proximity of the sides of the central oxidized porous silicon ridge defining the side walls of the respective channels, and forming uninterrupted ion permeable resin domains extending from the catalytic metal threads stemming from one metal electrode to the catalytic metal threads stemming from the other metal electrode; and
forming a connector for electrically connecting the pair of parallel metal electrodes to an external load circuit of the integrated fuel cell.

13. The process according to claim 12, wherein forming the oxidized porous silicon region in the monocrystalline silicon chip comprises processing a wafer of monocrystalline silicon by electrochemically eroding the crystalline silicon in an aqueous hydrofluoric acid solution forming an elongated region of porous silicon residue; and oxidizing the elongated region of porous silicon residue rendering it electrically nonconductive.

14. The process according to claim 13, wherein forming the at least one pair of parallel channels comprises:
  forming a multilayered dielectric stack for a hard mask over a surface of the monocrystalline silicon; and
  forming by a masked anisotropic dry etch of the dielectric hard mask stack the two parallel trenches reaching down to the oxidized porous silicon region.

15. The process according to claim 14, wherein forming the pair of parallel metal electrodes comprises:
  forming over a surface of the wafer, after removing the dielectric hard mask, an electrically conductive metallic multilayered stack including a topping flash sputtered metal seed layer; and
  growing, by galvanically depositing gold through defined parallel openings of a mask, parallel conductive metal electrodes over the metal seed layer on the oxidized porous silicon region and on adjacent definition edges of the dielectric stack of the hard mask, for forming connectable anode and cathode electrodes of the integrated cell.

16. The process according to claim 15, further comprising:
  removing the mask and the metallic multilayered stack from the surface of the wafer;
  depositing at least one planarizing layer of a dielectric material; and
  after having formed by etching of the oxidized porous silicon region, the parallel spaced channels defining a central ridge portion there between, on a top of which the pair of parallel metal electrodes were formed.

17. The process according to claim 12, wherein the cathodically depositing uninterrupted electrically conductive threads of a catalytic metal comprise:
  electroplating the catalytic metal from a solution containing ions of the metal to form electrically conductive uninterrupted threads of catalytic metal stemming from the bottom metallic surface of a cathodically polarized one of the two metal electrodes; and
  growing the threads through the open pores of the oxidized porous silicon of the central ridge portion without filling completely the voids, as far as reaching the side surface of definition of the central ridge portion of oxidized porous silicon, while anodically polarizing a counterelectrode immersed in the solution and biasing the other solid metal electrode of the cell to a positive voltage insufficiently lower than the voltage of the counterelectrode to prevent deposition thereon or toward it, and repeating the process step by inverting the metal electrodes, forming respective distinct dispersed active electrode structures of the fuel cell.

18. The process according to claim 12, wherein the dielectric cap is a separately fabricated element with respect to the monocrystalline silicon chip.

19. The process according to claim 12, wherein the dielectric cap comprises a first multilayered dielectric stack and an electrically isolated polysilicon layer forming a hard mask having a plurality of holes for forming by wet etch the at least one pair of parallel channels, and a top dielectric layer plugging the plurality of holes through the underlying polysilicon layer and a dielectric stack of a hard mask, except in correspondence to the inlet and outlet holes.

20. The process according to claim 12, wherein the central oxidized porous silicon ridge has an innermost central portion, underneath a separation gap between the parallel metal electrodes having pores of smaller average size than pores at and near the side faces thereof defining side walls of the respective channels.

21. The process according to claim 12, wherein the ion permeable resin comprises a cation exchange resin that fills the pores in the central oxidized porous silicon ridge when in a liquid form, and is then cured after evaporating the solvent.

* * * * *

UNITED STATES PATENT AND TRADEMARK OFFICE
CERTIFICATE OF CORRECTION

| | |
|---|---|
| PATENT NO. | : 7,892,693 B2 |
| APPLICATION NO. | : 11/611521 |
| DATED | : February 22, 2011 |
| INVENTOR(S) | : Siciliano et al. |

It is certified that error appears in the above-identified patent and that said Letters Patent is hereby corrected as shown below:

Column 5, Line 20    Delete: "metal are"
                                        Insert: --metal and are--

Column 6, Line 46    Delete: "from therefore from"
                                        Insert: --therefore--

Column 7, Line 13    Delete: "that"
                                        Insert: --of--

Column 7, Line 26    Delete: "hundreds"
                                        Insert: --hundred--

Column 8, Line 22    Delete: "to few"
                                        Insert: --to a few--

Column 8, Line 45    Delete: "and electrode"
                                        Insert: --and the electrode--

Column 9, Line 40    Delete: "of shape"
                                        Insert: --shape--

Column 10, Line 25    Delete: "doted"
                                        Insert: --dotted--

Column 11, Line 10    Delete: "of few"
                                        Insert: --of a few--

Column 11, Line 25    Delete: "impregnated,"
                                        Insert: --impregnated.--

Signed and Sealed this
Twenty-sixth Day of July, 2011

David J. Kappos
*Director of the United States Patent and Trademark Office*

CERTIFICATE OF CORRECTION (continued)
U.S. Pat. No. 7,892,693 B2

| | |
|---|---|
| Column 11, Line 27 | Delete: "hydrophilic."<br>Insert: --hydrophilicity.-- |
| Column 11, Line 39 | Delete: "of few"<br>Insert: --of a few-- |
| Column 11, Line 66 | Delete: "further" |
| Column 11, Line 67 | Delete: "thirty minutes"<br>Insert: --thirty minutes further-- |
| Column 13, Line 2 | Delete: "conformally"<br>Insert: --conformally on-- |
| Column 13, Line 61 | Delete: "such those"<br>Insert: --such as those-- |